US005893685A

United States Patent [19]

Olson et al.

[11] Patent Number: 5,893,685

[45] Date of Patent: Apr. 13, 1999

[54] MULTIPLE BIT POWER TOOL

[75] Inventors: Kirk B. Olson, Golden; Michael R. Edwards, Aurora, both of Colo.

[73] Assignee: Orb Industries, Inc., Golden, Colo.

[21] Appl. No.: 08/797,192

[22] Filed: Feb. 11, 1997

[51] Int. Cl.[6] .......... B23Q 3/157; B23B 45/00

[52] U.S. Cl. .......... 408/35; 81/439; 408/124; 483/51

[58] Field of Search .......... 408/9, 16, 35, 408/124, 241 R; 483/30, 36, 51, 57, 69; 81/57.5, 439

[56] References Cited

U.S. PATENT DOCUMENTS

| | | |
|---|---|---|
| D. 336,305 | 6/1993 | Iadonisi . |
| 2,303,565 | 12/1942 | Luna . |
| 2,679,770 | 6/1954 | Carter et al. . |
| 3,610,641 | 10/1971 | Ryder . |
| 3,807,745 | 4/1974 | Bent . |
| 4,252,333 | 2/1981 | Vogel . |
| 4,260,169 | 4/1981 | Hall . |
| 4,275,893 | 6/1981 | Bilanceri . |
| 4,277,074 | 7/1981 | Kilberis . |
| 4,305,597 | 12/1981 | McCarty . |
| 4,395,170 | 7/1983 | Clarey . |
| 4,527,809 | 7/1985 | Umbert . |
| 4,604,005 | 8/1986 | Russ . |
| 4,682,918 | 7/1987 | Palm . |
| 4,797,796 | 1/1989 | Eastman, II et al. . |
| 4,817,971 | 4/1989 | Flynn . |
| 4,844,488 | 7/1989 | Flynn . |
| 4,848,779 | 7/1989 | Wheeler et al. . |
| 4,867,249 | 9/1989 | Watkins, Jr. et al. . |
| 4,954,026 | 9/1990 | Zurwelle . |
| 5,022,131 | 6/1991 | Hobbs . |
| 5,065,498 | 11/1991 | McKenzie . |
| 5,174,588 | 12/1992 | Reibetanz et al. . |
| 5,195,760 | 3/1993 | Wheeler et al. . |
| 5,197,749 | 3/1993 | Moore et al. . |
| 5,218,890 | 6/1993 | Christ, Jr. . |
| 5,346,453 | 9/1994 | Rivera-Bottzeck . |
| 5,354,075 | 10/1994 | Marik et al. . |
| 5,360,359 | 11/1994 | Reynolds . |
| 5,375,857 | 12/1994 | Rohm . |
| 5,390,940 | 2/1995 | Morlino et al. . |
| 5,531,549 | 7/1996 | Fossella . |

FOREIGN PATENT DOCUMENTS

| | | |
|---|---|---|
| 1073681 | 2/1965 | United Kingdom . |
| PCT/US93/08634 | 9/1993 | WIPO . |

OTHER PUBLICATIONS

Bosch Drill Manual—admitted prior art.

*Primary Examiner*—Daniel W. Howell

[57] ABSTRACT

The present invention relates to a portable electric drill having a rotatable magazine containing multiple tool bits from which a single bit may be selected for use. The magazine is in the form of an approximate 120-degree segment of a cylinder with a plurality of open grooves for holding the various bits. The drill includes a Jacobs-type chuck assembly with a bore into which the selected bit is inserted for use. The magazine may be rotated to position any one of the magazine grooves into axial alignment with the bore of the chuck, so that the user may index the magazine to position a selected bit for expulsion from a particular magazine groove into the chuck. The chuck may then be tightened around the selected bit and the electric motor actuated to drive the bit. A cable assembly within the drill housing is operable with an exterior button to be movable between a stored position and a forward position to push a selected bit from a groove on the magazine into the chuck assembly. A magnet on an end of the cable assembly is attracted to the shank of a selected bit, permitting the cable assembly also to be used to retract the selected bit from the chuck assembly. The magnet may remain against the shank of the selected bit while the bit is in use, both as a bearing surface and to assist in holding the bit within the chuck, particularly when the chuck is disengaged from the bit. An aperture is provided in the wall the drill housing, and the magazine may be rotated to align any one of the grooves with the aperture to expose in the aperture the groove and any bit it contains, permitting ready identification and cleaning of the bit.

30 Claims, 4 Drawing Sheets

MULTIPLE BIT POWER TOOL

BACKGROUND OF THE INVENTION

The invention relates to the field of hand tools and more particularly to the field of power drills, and even more particularly to hand-held power drills that can store multiple drill bits or other rotary tool bits internally in a rotatable magazine for selective use.

The conventional hand-held power drill has been a simple and generally effective tool for occasional use. The portable drill typically known to the art has a three jaw chuck assembly, with or without a chuck key, in which a selected tool bit is loaded for use from a remote storage container. After completion of a drilling or driving task, the tool bit is removed and returned to the storage container. The drilling task is then repeated using another, different, tool bit if required.

A compelling need for more efficiency in construction and assembly contexts has forced a re-evaluation of the time wasted in the selection, loading, unloading and general handling of tool bits. Some drill users employing conventional devices have resorted to the use of dedicated drill bit units to save time. Dedicating a drill to one tool bit is more efficient than repeatedly changing bits, but requires the higher capital investment of purchasing multiple drills where one will do. Dedicated drills also increase workplace clutter, and involve the time to put one unit down to search for and employ another unit.

Previous attempts have been made to solve the aforementioned problems. For example, as illustrated in U.S. Pat. No. 5,065,498 to McKenzie, it has been proposed to use a hook in the drill unit which engages an annular groove of a bit element holder upon manual manipulation of a bolt assembly with a cylindrical magazine to load/unload a bit element. The McKenzie device, however, requires specially machined bit element holders for every size of bit element, which increases the cost of the drill, and limits the variety of bit elements that can be used. Furthermore, a lack of visual reference of individual tool bit elements frequently requires a user to load and unload bit elements to find the desired bit. Because the bit-carrying bores of the McKenzie device are closed, dirty bits stored therein can not be cleaned without unloading the magazine. The inability easily to clean bits eventually will cause the drill to malfunction due to debris falling from the uncleaned bits into the motor and switch.

Another example of previous effort in the field is U.S. Pat. No. 5,346,453 to River-Bottzeck. The River-Bottzeck device uses a cylindrical tool bit magazine which has a very limited view port near the shank portion of the bit elements. Viewing only portions of bit shanks, however, makes positive identification of each bit almost impossible, and again an unload/load search may be required to find the correct bit element. Additionally, the tool bit bores of the Rivers-Bottzeck device can not be cleaned after a dirty bit element is re-inserted therein. The resulting inability to access and clean a bit immediately after use causes the drill to malfunction over time, due to debris eventually falling from the magazine into the drill motor and switch.

Also, most known multiple bit drill devices do not provide for a torque control device to prevent damage to the drill drive system. Some known non-multiple bit or "non-magazine" drills control torque range through the use of a multiple-step electronic control to shut off the motor when the voltage drop across the motor exceeds a preselected limit. To our knowledge, this type of solution has only been adopted in non-magazine drills. Because of the unique power train requirements of magazine type drills, however, selective torque control is not available in known devices. The device disclosed in the '498 patent to McKenzie does not provide any method for torque control, and the device of the '453 patent to Rivers-Bottzeck provides torque protection for the chucking mechanism only. The '498 patent to McKenzie and the '453 patent to Rivers-Bottzeck are believed fairly to represent the state of the art of multiple-bit portable drills, and the entire disclosure of each of those patents respectively is incorporated herein by reference.

SUMMARY OF THE INVENTION

The present invention provides a multiple bit drill apparatus with a bit magazine that is open to expose the bit elements for cleaning after use to prevent dirt and grime from clogging the motor or switch, and further to provide a full visual reference of what bit element is in what slot. The use of an open magazine is enabled by using the inner surface of the drill housing to complete the enclosure of the magazine to capture the bit elements. A movable cable assembly with a connector, preferably magnetic, provides a means for expelling individual brill bits from slots on the magazine into a bore in the chuck, and the chuck includes components for selectively securing the bit in position for use. The incorporation in the invention of an electronic torque control in the switch provides torque control independent of the drill's drive train configuration, thus solving the problem of torque control in a magazine type drill.

DETAILED DESCRIPTION OF A PREFERRED EMBODIMENT

Figure 1:
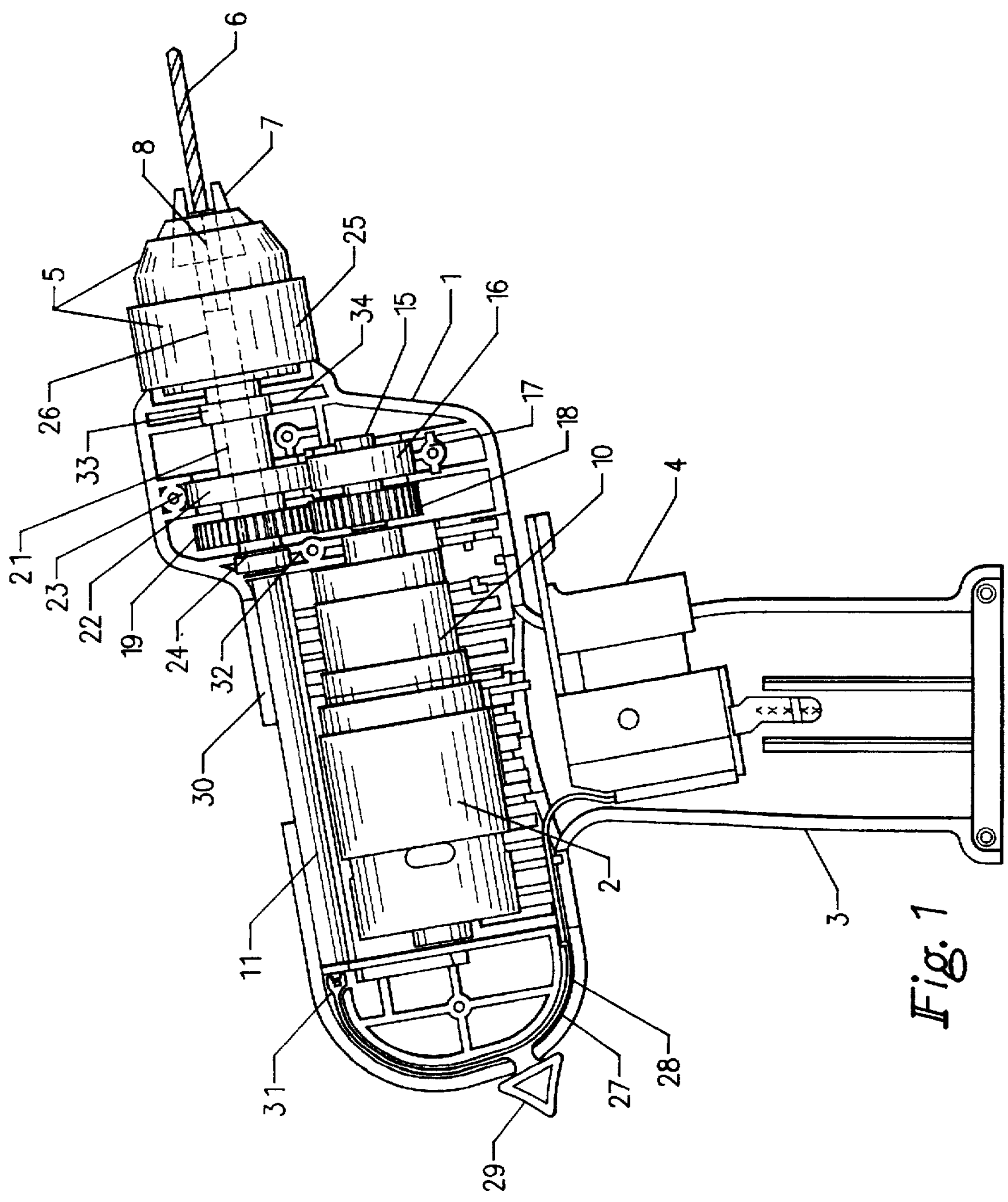
FIG. 1 is a sectional side view of a preferred embodiment of the bit drill of the present invention, showing the cable assembly in a stored position and a bit within the chuck assembly.

Referring to the drawings, in which like numerals designate like elements throughout the figures, FIG. 1 illustrates the multiple-bit power drill of the present invention. The drill includes a housing 1 which mounts an electric motor 2 and a chuck assembly 5 for holding a drill bit 6. A lower portion of the housing 1 defines a handle 3 upon which a trigger switch 4 is movably disposed. The motor 2 is a conventional electric motor, such as, for example, a 12-volt MABUCHI® Motor Model Number RS-750SF-7034. The body of the motor 2 is substantially cylindrical, and is mounted substantially radially symmetrically within the housing 1. In this disclosure, the terms "drill bit," "tool bit" or "tool bit element" refer to bits adapted to be driven in a rotary drill, including conventional drill bits for drilling holes in solid materials but also including without limitation screwdriver bits, nut drivers, and the like.

Figure 2:
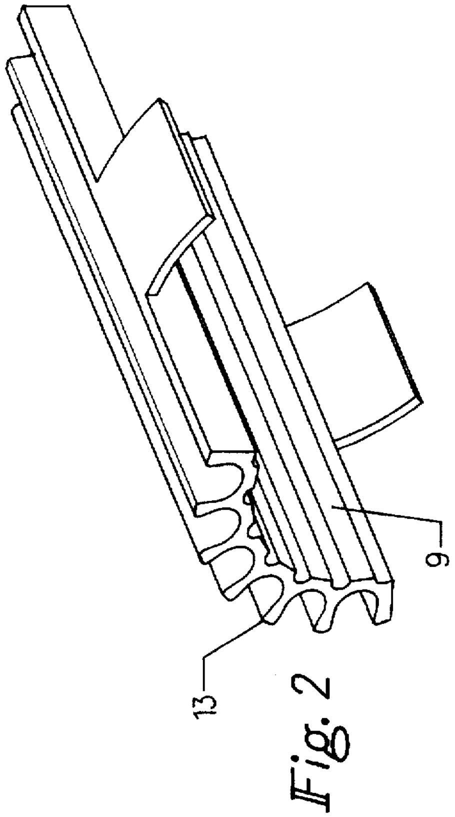
FIG. 2 is a perspective view of the interior side of the magazine component of the preferred embodiment.

The major portion of the housing 1 preferably is substantially cylindrical to define a pair of arcuate walls 30 surrounding the motor 2, substantially parallel to the motor. Mounted within housing 1 is a generally arcuate, elongated magazine 9. As best seen in FIG. 2, the magazine 9 is shaped in the form of a segment of a cylinder, spanning an arc of about 70° to about 150°, but preferably 120°. In the preferred embodiment, the magazine 9 includes six parallel grooves 11, a desirable number from considerations of weight and bit assortment. IN alternative embodiments, smaller magazines may carry as few as three bits, while larger magazines of up to about 170° in arcuate size can carry eight bits. Magazine 9 is disposed in the housing 1 for rotation about an imaginary longitudinal axis substantially coextensive with the axis of the cylindrical segment of the magazine., and is approximately coaxial with the generally cylindrical motor 2. The magazine 9 has on its exterior a plurality of longitudinal grooves 11 separated by parallel ribs 13. Grooves 11 are equally angularly spaced along the arc of, and substantially equidistant from the axis of, the magazine 9. Each groove 11 preferably is generally arcuate or semi-cylindrical, and is sized to receive a tool bit 6, the bit 6 preferably including a hex head 8. The arc of each groove 11 preferably is at least about 180 degrees, but less than 360 degrees, so that each groove 11 defines a longitudinal slot between adjacent ribs 13 opening radially outward from the axis of the magazine 9 to allow the cable 28 and button 29 (described in detail below) to pass through to expel the tool bit 6.

Figure 4:
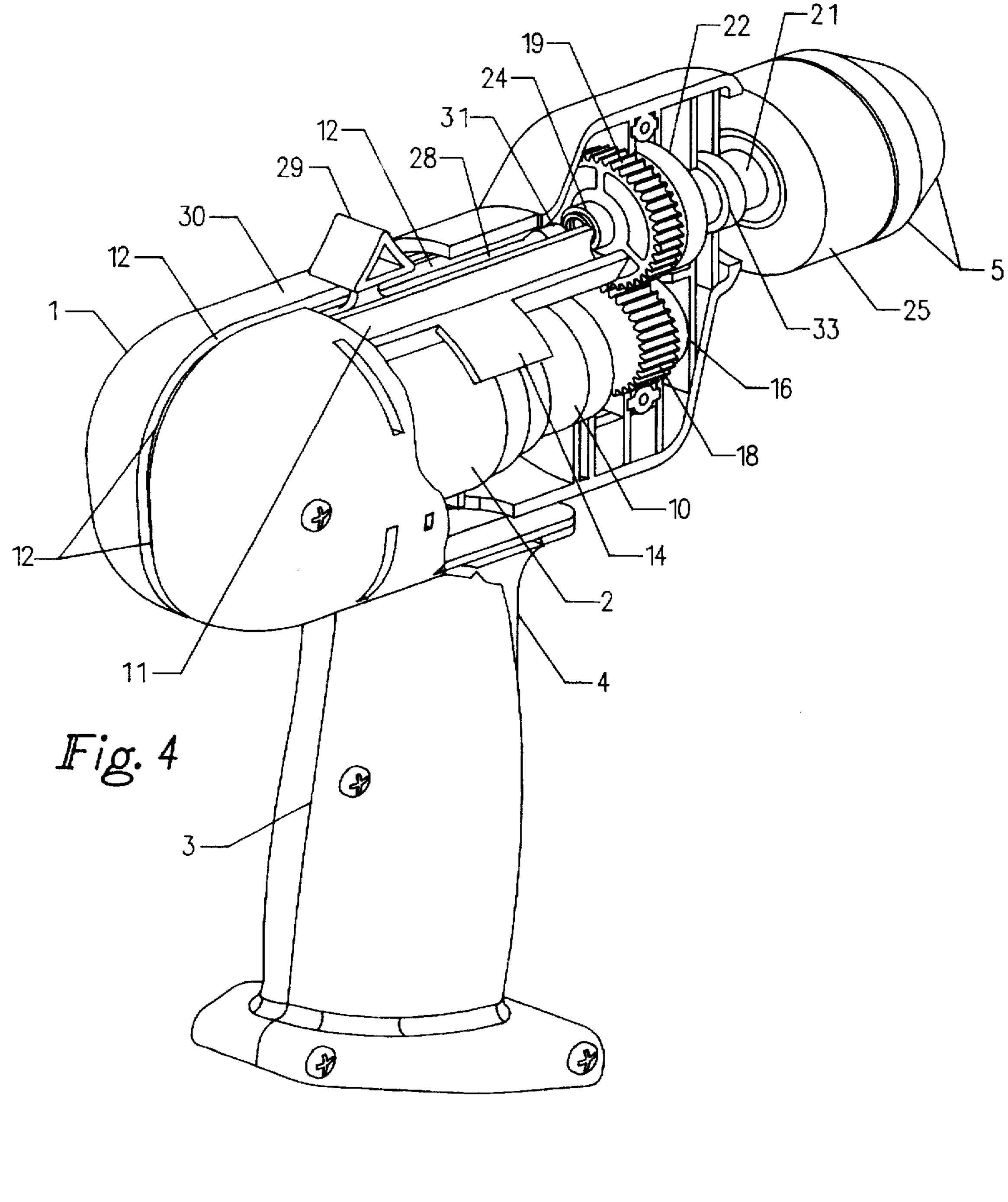
FIG. 4 is a perspective view of the preferred embodiment of the a bit drill of the present invention, showing the cable assembly in a forward position and with a portion broken away to show certain interior elements.
Figure 5:
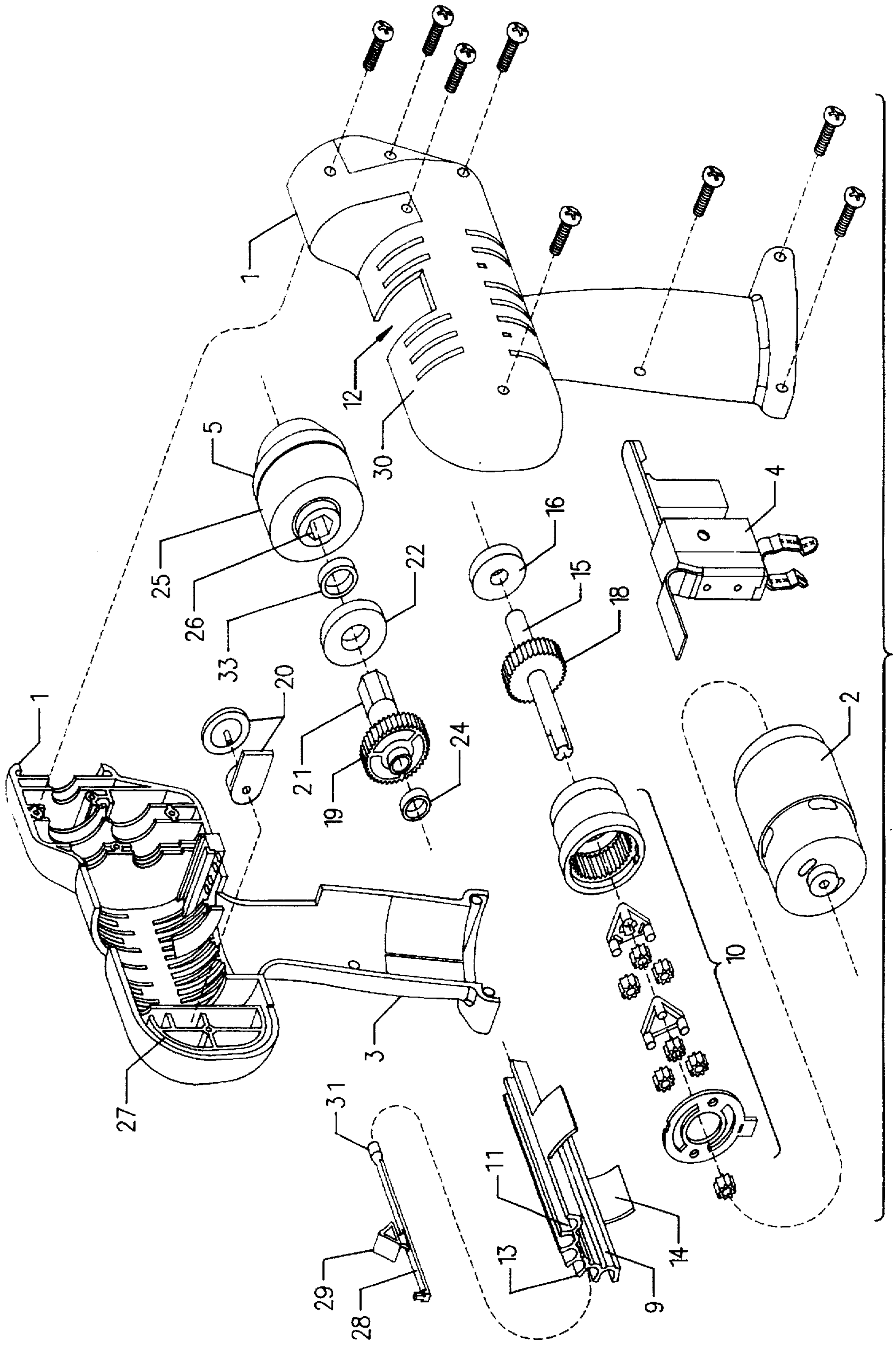
FIG. 5 is an exploded perspective view of components of the bit drill of a preferred embodiment of the present invention.

As indicated in FIGS. 4 and 5, the magazine 9 is mounted around the motor 2 and the planetary transmission 10 for rotation about the motor 2. The magazine 9 is movably disposed concentrically within and substantially parallel to the arcuate walls 30 of the housing 1, with the grooves 11 facing radially outward, so that the grooves 11 are effectively sandwiched between the body of the magazine 9 and the wall 30 of the housing 1. Because the grooves 11 are between the housing wall and the magazine 9, the housing 1 covers in whole or in part the open slot between ribs 13 corresponding to each groove 1 1. Each one of multiple tool bits 6 accordingly is confined within a respective one of the grooves 11, so that the bit elements are prevented from exiting the groove 11 via the open slot. The housing 1 thus acts as the containing shell of the magazine 9, as the inner surface of the housing I closes the open portion of each groove 11, holding the tool bits 6 within the magazine 9. As explained further, only the selected tool bit 6 in a groove 11 axially aligned with the chuck assembly 5 may be moved through the groove 11.

As best seen in FIG. 4, In order to allow manual rotation of the magazine 9, a portion of the housing 1 is cut away to define an aperture 12 revealing the ribs 13 on the magazine's exterior surface. The ribs 13 can be manipulated through the aperture 12 by the user's fingers to push the ribs 13 past the aperture 12 to align successive grooves 11 with the aperture 12. As also seen in FIGS. 2 and 5, the magazine 9 has sight shields 14 which move into position to cover and close the aperture 12 at the extremes of magazine 9 rotation.

Each groove 11, opening outwardly (radially away from the magazine's axis of rotation) for most or all its length, also offers a means of viewing and/or accessing each tool bit element 6 disposed therein. The elongated window aperture 12 provides an opening through which the bits 6 may be accessed for identification or cleaning. The window aperture 12 is substantially parallel to the rotational axis of the magazine 9, and the magazine 9 is selectively rotatable to align parallel with the aperture 12 any one of the open slots corresponding to the grooves 11. The aperture 12 has a length longer than the bit 6, so that at least a portion of the working or cutting end of the bit is viewable through the aperture 12. When the slot of a selected groove 11 is rotated into alignment with the aperture 12, the groove 11 and any bit 6 the groove holds are exposed for viewing in the aperture 12, making it possible to recognize quickly if the selected groove 11 contains a desired bit element 6. The user, by consecutively rotating the grooves 11 into alignment with the aperture 12, can bring successively into view substantially the entire length of each of the bits 6, to quickly survey the contents of the magazine 9. The aperture 12 is sufficiently narrow to prevent any bit from falling out of the groove 11. The need, commonly encountered in known devices, to unload and reload for identification the bits in the magazine is eliminated.

Additionally, when a selected groove 11 and tool bit 6 are rotated into alignment with the aperture 12, the selected bit 6 can be inspected for cleanliness. If dirty, the selected bit can be cleaned in place in the magazine 9 by the user blowing into the groove 11, or with a puff of compressed air, or by inverting and tapping the drill. Alternatively, the selected bit 6 may be loaded into the chuck assembly 5 for extensive cleaning outside the magazine 9. Empty grooves 11 not holding a tool bit can be cleaned easily by means of simple air flow through groove 11 while the groove is exposed in the aperture 12. The aperture 12 thus provides access to any selected groove 11 aligned therewith to permit convenient identification and cleaning of the bit 6 contained in the groove.

Figure 3:
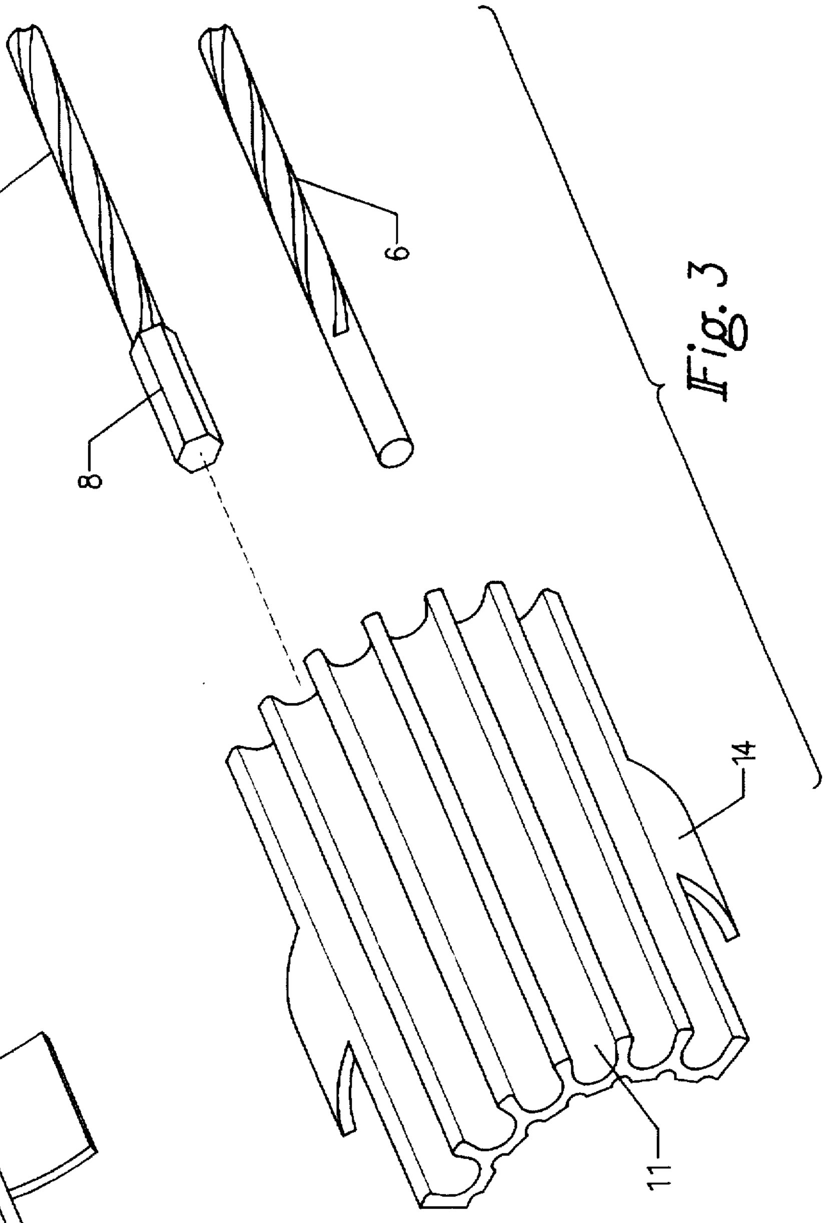
FIG. 3 is a perspective view of the exterior side of the magazine component shown in FIG. 2, also showing drill bits usable in combination with the preferred embodiment of the invention.

The electric motor 2 mounted in housing 1 drives, via the planetary transmission 10, a drive shaft 15 on the lengthwise axis of the motor 2 as seen in FIGS. 4 and 5. A manually activated switch 4 acts as a throttle to variably control the speed of the electric motor 2. An end bearing 16 captured in a bearing pocket 17 on the housing 1 supports the end of the drive shaft 15 in the housing 1. The bearing pocket 17 is configured to prohibit axial movement of the end bearing 16. A gear 18 meshes with a cooperating gear 19 on a hollow shaft 21, which in turn is connected to the chuck assembly 5. Chuck assembly 5 preferably comprises a substantially conventional Jacobs chuck with three jaws 7 which may be selectively tightened against the shank or hex head 8 of a drill bit 6 (FIG. 3). Chuck assembly 5 rotates on the shaft 21, which is supported by bearing 22 captured in a bearing pocket 23, a bushing 24 in the bushing pocket 32, and another bushing 33 in a second bushing pocket 34 in the housing 1. Notably, the shaft 21 is hollow to pass bit elements 6 from the magazine 9 through to the chuck assembly 5.

The alignment and support structure for the chuck assembly 5 preferably is maintained by a five point system. Gear 19 and bearing 22 comprise the main chuck assembly supports, with bushing 24 and bushing 33 providing torsion control through bearing support pockets 32 and 34. The interface between the housing 1 and the back of the chuck assembly 5 comprises an additional thrust control surface, a round (e.g., approximately 2.0 inches diameter) flat surface which promotes parallelism among the shaft 21, chuck assembly 5, and drive shaft 15.

Chuck assembly 5 preferably is a conventional Jacobs chuck assembly with a sleeve body 25, except that the assembly is modified to provide a central bore 26 through the assembly. Bits 6 are moved through the bore 26 into position to be gripped by the jaws 7 when the sleeve body 25 is rotated.

The present invention includes components for expelling a selected tool bit 6 from any one of the grooves 11 through the shaft 21 and into the bore 26 for use. Referring to FIG. 1, housing 1 is formed with a track 27, preferably curved, to contain and guide a cable assembly comprising a flexible cable 28, a slide button 29 mounted approximately midway along the cable 28, and a magnet 31 disposed upon one end of the cable. The longitudinal, preferably plastic cable 28 carries button 29 thereon, but the button 29 is disposed through aperture 12 in the housing and is disposed mostly outside the housing. Cable 28 has on its forward or distal end a magnet 31 secured within a cage or bracket. Referring to FIGS. 1, 4, and 5, the cable 28 is disposed within the housing 1 and is movable axially between a forward position extending at least partially into one of the grooves 11, as indicated in FIG. 4, and a stored position completely retracted back out of the groove 11 and into the track 27, as seen in FIG. 1. The cable 28 is slidable along the track 27. A user may manually shift the cable 28 by means of the button 29 upon and outside the housing 1 through aperture 12. The magnet 31 functions as a temporary and easily released means for linking the distal end of the cable 28 to a selected one of the tool elements 6 (which are fashioned from a metal that is attracted to the magnet) when a corresponding one of the grooves 11 is aligned with the bore 26. As the button 29 is operated to move the cable 28 upwardly, the cable is moved from a stored position to the forward position through groove 11 whereby the magnet 31 contacts a selected tool bit element 6 to urge the bit into the bore 26.

Notably, the cable and magnet 31 do not need to be withdrawn to the retracted position before actuating the drill motor to drive the bit 6. The magnet 31 may remain in contact with the shank of the bit 6, and act as a bearing surface against which the shank of the bit 6 rotates. Accordingly, the magnet 31 continues to assist in maintaining the bit 6 within the chuck assembly 5. Particularly, when drilling is discontinued and the chuck assembly 5 is disengaged from the bit 6, the magnet 31 continues to hold the bit 6 to prevent the bit from inadvertently falling from the open jaws 7.

The cable assembly is longitudinally sized to expel a standard hex bit element 6 (FIG. 3) into a forward locking position within the chuck assembly 5, and yet to permit the magazine 9 to rotate when the cable 28 and magnet 31 are retracted to the stored position shown in FIG. 1. The cable 28 normally is stored in the rear portion of the track 27 when the drill is not in use. In the stored position, the cable 28 and magnet 31 are retracted from the magazine 9, but act as a backward stop for any bit element 6 in a groove 11 aligned with the chuck assembly 5. The cable 28 and magnet 31 also act as a magnetic holder to maintain the selected tool bit 6 within the bore 26, preventing the bit 6 from exiting through an open chuck assembly 5. Non-selected bit elements 6 in the magazine 9, that is, bits not aligned with the shaft 21 and bore 26, are held against axial movement by structural ribs (not shown) on and within the housing 1, to prohibit their sliding outside of the magazine 9.

The switch 4 is a variable speed control device for controlling motor RPM. By means of switch 4, the motor 2 may be actuated and de-actuated and its speed adjusted and reversed. The switch 4 includes a multiple-step adjustable electronic control operative, adjusted with potentiometer assembly 20 connected to switch 4, to shut off the motor 2 when the voltage drop across the motor exceeds a preselected limit. A suitable potentiometer and switch assembly is available from Marquardt Switches, Inc., Cazenovia, N.Y., Model Number 2701.5103. The drill's torque range is controlled thereby, permitting the drill to be pre-set to shut off power when, for example, a certain drilling depth is attained.

The invention thereby offers an advantage over known multiple bit devices, which, due to the use of bit magazines, have involved power trains incorporating multiple geared, offset drive shafts. Complex drive trains are not easily and effectively modified to include mechanical clutches for torque control. The drill according to the present invention utilizes a complex drive train, but nevertheless provides an electronic clutch to provide torque control in a multiple-bit drill assembly.

FIG. 3 shows that any of the multiple drill bits may be a standard bit 6 of any of various usual sizes. Bit 6 may have a round shank, but preferably has a hexagonal shank 8. A hexagonal shank improves the security of the grip of the chuck assembly 5 on the bit 6 in a chuck system that is tightened by hand.

In one mode of practicing the invention, the user selects the desired bit element 6 by accessing the ribs 13 through the aperture 12 and by manually rotating the magazine 9 until the selected bit element 6 is visually identified through the aperture 12. The aperture 12 thus functions as a position indicator to axially align the groove 11 containing the selected bit 6 with the shaft 21 and the bore 26 in the chuck assembly 5. When the selected bit 6 has been aligned with the bore 26, the slide button 29 on the cable 28 is pushed forward in the curved track 27, upwardly around the back of the housing 1, until it reaches the forward position. The resulting movement of the cable 28 expels the selected bit 6 forward from the groove 11, into the hollow shaft 21 and the bore 26 in the chuck assembly 5. With the magnet 31 in the forward position, the bit 6 is in the proper place to be gripped by the jaws 7. The dimensions of the cable 28 and magazine 9 are such that with the cable 28 in the forward most position, the bit element 6 extends the proper distance out from the chuck assembly 5. The chuck assembly 5 is then tightened onto the drill bit 6 by using hand pressure. Specifically, the user manually grasps and holds the sleeve 25 of the chuck assembly 5 and, squeezing the trigger of the switch 4, actuates the drill motor 2 in a forward direction to tighten the jaws 7 of the chuck assembly 5 around the selected tool bit element 6.

Similarly, to change the operating drill bit 6, the chuck assembly 5 is loosened from the drill bit 6 by manually gripping the sleeve 25 and running the motor in reverse by controlled operation of the switch 4. With the first bit element 6 loose, the cable 28 is retracted by manual operation of the button 29 into the stored position of FIG. 1. The first bit element 6, still magnetically connected to the magnet 31, is pulled into a retracted position in the empty groove 11 in the magazine 9. Retracting the cable 28 to the rear of the track 27 replaces the first selected bit element 6 in the aligned corresponding groove 11 of the magazine 9. With the cable 28 retracted and all the bits within corresponding grooves on the magazine 9, the magazine 9 is again freely rotatable to be indexed to another bit element 6 to repeat the mode of expelling a second selected tool bit from another groove 11.

In sum, there is provided a power drill apparatus for driving any selected one of multiple tool bits, the apparatus comprising generally a housing 1, a chuck assembly 5, a magazine 9 adapted to hold the multiple bits, and means for expelling a selected bit from the magazine into the chuck assembly 5. More specifically, the chuck assembly 5 includes an axial bore 26 for receiving the selected tool bit, and a releasable means for holding the tool bit in the axial bore 26. The magazine 9 is arcuate, elongated, and rotatable about an axis within the housing 1. The magazine 9 includes thereon a plurality of longitudinal grooves 11, each groove being adapted to hold a respective one of the multiple tool bits by comprising an arc of al least 180 degrees but less than 360 degrees. Each open groove 11 thus defines a longitudinal slot opening radially outward from the magazine's axis of rotation so that the magazine 9 is rotatable to align axially any one of the grooves 11 with the bore 26. When the groove 11 holding the selected bit is aligned with the aperture 12 and with the bore 26, the bit may be expelled into the bore 26 where the bit is held in position for use. Preferably, the housing 1 comprises an arcuate wall 30, and the magazine 9 is disposed concentrically within and substantially parallel to the wall 30, so that the grooves 11 are between the wall 30 and the magazine 9, and the housing 1 covers each slot, at least in part, defined by each groove 11, thereby confining the tool bits from exiting the groove 11 via the open slot. An elongated aperture 12 is provided in the housing wall 30, and the magazine 9 is selectively rotatable to align any one of the slots of the grooves 11 parallel with the aperture 12 to expose in the aperture 12 the corresponding groove. When a groove slot is aligned with the aperture 12, at least a majority of the selected tool bit within the corresponding groove 11 is directly viewable and/or accessible for identification and/or cleaning through the aperture 12. Because a large portion of the bit 6 is readily seen, unique identification marks or characters are viewable, eliminating the need to guess which bit 6 is aligned with the bore.

In sum, there is provided a power drill apparatus for driving any selected one of multiple tool bits, the apparatus comprising a housing; a chuck assembly for securing the selected tool bit, comprising an axial bore for receiving the tool bit and means for releasably holding the tool bit in the axial bore; an arcuate elongate magazine rotatable about an axis within the housing and including thereon a plurality of longitudinal grooves, each of the grooves adapted to hold a respective one of the multiple tool bits and comprising an arc of at least about 180 degrees and less than 360 degrees to define a longitudinal slot opening radially outward from the axis; and means for expelling, from one of the grooves into the bore, the selected one of the tool bits; wherein the magazine is rotatable about the axis to align axially any one of the grooves with the bore. The housing comprises an arcuate wall, and the magazine is disposed concentrically within and substantially parallel to the wall, so that the grooves are between the wall and the magazine, and the arcuate wall covers the slot at least in part to confine the respective one of the tool bits from exiting the groove through the slot.

Also according to the invention, a power drill apparatus is provided for use in combination with any selected one of multiple tool bits, the apparatus comprising a housing; a chuck for securing the selected tool bit comprising an axial bore for receiving the tool bit and means for releasably holding the bit in the axial bore; an arcuate elongate magazine rotatable about an axis within the housing and including thereon a plurality of longitudinal grooves, each of the grooves adapted to hold a respective one of the multiple tool bits; a motor for rotating the chuck; variable switching means for actuating, adjusting, reversing and de-actuating the motor; an adjustable potentiometer operatively connected to the switch whereby the motor is de-actuated when a voltage drop across the motor exceeds a predetermined limit; and means for expelling, from one of the grooves into the bore, the selected one of the tool bits; wherein the magazine is rotatable about said axis whereby to align axially any one of the grooves with the bore. The chuck comprises a Jacobs chuck having a manually graspable exterior sleeve, wherein the means for releasably engaging comprises radially movable jaws engageable against the selected tool bit by actuating the motor while the sleeve is manually grasped, or alternatively by employing a conventional key.

As will be apparent to those skilled in the art, various modifications and adaptations of the structure above described may be made without departing from the spirit of the invention, the scope of which is to be construed in accordance with the accompanying claims. For example, rather than using a multiple-step adjustable electronic control operative to shut off the motor on the switch, this feature could be eliminated from the switch and substituted with another mechanical means of accomplishing the same task without altering the scope of the invention as set forth in the following claims.

We claim:

1. A power drill apparatus for driving any selected one of multiple tool bits, said apparatus comprising:

a housing having an inner surface;

a chuck possessing an axial bore for securing the selected tool bit, said chuck including means for selectively releasably holding the selected tool bit in said axial bore;

an elongate magazine rotatable about an axis within said housing and including thereon a plurality of longitudinal grooves for holding one of the multiple tool bits, each of said grooves having an open side facing outward away from said axis and cooperating with said inner surface of said housing to prevent accidental dislodgement of a multiple tool bit contained therein, said magazine rotatable about said axis for selectively aligning said groves with said bore; and means for selectively expelling a selected tool bit from one of said grooves into said bore.

2. A power drill apparatus for driving any selected one of multiple tool bits, said apparatus comprising:

a housing:

a chuck possessing an axial bore for securing the selected tool bit, said chuck including means for selectively releasably holding the selected tool bit in said axial bore;

an elongate magazine rotatable about an axis within said housing and including a plurality of longitudinal grooves for holding a respective one of the multiple tool bits, each of said grooves having an open side;

wherein said housing comprises a substantially arcuate wall and said magazine is disposed substantially concentrically within said wall, such that the interior surface of said wall at least partially covers said open sides of said grooves thereby confining the respective one of the tool bits disposed within said grooves from exiting said grooves.

3. An apparatus according to claim 2 further comprising a substantially cylindrical motor for rotating said chuck means, wherein said motor is arranged concentrically within said magazine and said housing wall, and wherein said magazine is movably supported upon said motor.

4. An apparatus according to claim 2 wherein said magazine comprises an arc of approximately 70 to approximately 150 degrees and said plurality of grooves number between 3 and 8.

5. An apparatus according to claim 2, further wherein said arcuate wall of said housing possesses an elongated external window aperture, and wherein said magazine is selectively rotatable to expose in said aperture a selected one of said grooves.

6. An apparatus according to claim 5, wherein when said one of said grooves is exposed in said aperture, an identifying, unique portion of the tool bit within said groove is directly viewable through said aperture.

7. An apparatus according to claim 5, wherein when said one of said grooves is exposed in said aperture, the tool bit within said groove is accessible for cleaning through said aperture.

8. An apparatus according to claim 2, wherein said means for expelling comprises:

a cable within said housing and movable between a forward position extending at least partially into said one of said grooves and a stored position retracted from said groove; and a button carried by said cable and disposed outside housing for manually moving said cable;

wherein when said one of said grooves is aligned with said bore, said button is operable to move said cable from said stored position to said forward position, such that said cable urges the selected tool bit into said bore.

9. An apparatus according to claim 8, wherein when said motor is actuated to rotate said chuck means, said cable continues to urge the selected tool bit into said bore.

10. An apparatus according to claim 8, wherein when said cable further comprises a magnet disposed on one longitudinal end thereof and adapted for selective connection to the selected tool bit.

11. An apparatus according to claim 10, wherein said button is operable to move said cable from said forward position to said storage position, such that said selected tool bit is withdrawn from said bore.

12. An apparatus according to claim 11, wherein when said cable is in said storage position, said magazine is rotatable to release the connection of said magnet from said selected tool bit.

13. A power drill apparatus for use in combination with any selected one of multiple tool bits, said apparatus comprising:

a housing;

a chuck possessing an axial bore for securing said selected tool bit, said chuck including means for selectively releasably holding said selected tool bit in said axial bore;

an elongate magazine rotatable about an axis within said housing and including thereon a plurality of longitudinal grooves, each of said grooves adapted to hold a respective one of said multiple tool bits, said magazine rotatable whereby any one of said grooves may be selectively axially aligned with said bore;

a motor for rotating said chuck means;

variable switching means for actuating, adjusting, reversing and deactuating said motor;

an adjustable potentiometer operatively connected to said switch whereby said motor is deactuated when a voltage drop across said motor exceeds a predetermined limit; and means for selectively expelling, from one of said grooves into said bore, said selected tool bit.

14. An apparatus according to claim 13, wherein said chuck comprises a Jacobs chuck having a selected one of a key and a manually graspable exterior sleeve and wherein said means for selectively releasably engaging comprises radially movable jaws engageable against said selected tool bit by actuating said motor while said sleeve is manually grasped.

15. An apparatus according to claim 14, wherein each of said tool bits comprises a hexagonal shank.

16. An apparatus according to claim 13, wherein said means for selectively expelling comprises:

a cable movable between a forward position extended at least partially into said one of said grooves and a stored position completely retracted from said groove;

magnetic means for releasably linking a longitudinal end of said cable to said selected tool bit;

a button carried by said cable and disposed outside said housing for manually moving said cable from said stored position to said forward position when said groove is aligned with said bore, whereby to contact said magnetic means against said selected tool bit to urge said tool bit into said bore.

17. An apparatus according to claim 16, wherein when said motor is actuated to rotate said chuck means, said cable remains in said forward position, and said magnetic means remains in contact with said selected tool bit.

18. A power drill apparatus for driving any selected one of multiple tool bits, said apparatus comprising:

a chuck having an axial bore for receiving a selected tool bit, said chuck including means for selectively releasably holding said tool bit in said axial bore;

a magazine including thereon a plurality of longitudinal grooves, each of said grooves for holding a respective one of the tool bits, said magazine movable to align axially any one of said grooves with said bore;

means for confining said multiple tool bits within said grooves;

a cable movable within said housing from a stored position retracted from any of said grooves to a forward position extending at least partially through one of said grooves when said groove is axially aligned with said bore to expel a selected tool bit from said groove into said bore; and means for moving said cable between said stored position and said forward position.

19. An apparatus according to claim 18 further comprising a housing having an arcuate wall, and wherein said magazine is disposed substantially concentrically within said wall, whereby said grooves are between said wall and said magazine, and said arcuate wall at least partially covers said grooves to confine said multiple tool bits within said grooves.

20. An apparatus according to claim 19, wherein said means for exposing comprises said arcuate wall possessing an elongated window aperture therein, and wherein said magazine is selectively rotatable to expose in said aperture at least a portion of said groove.

21. An apparatus according to claim 20, wherein when said grooves is exposed in said aperture, an identifying, unique portion of said selected tool bit is directly viewable through said aperture.

22. An apparatus according to claim 20, wherein when said groove is exposed in said aperture, at least a portion of said selected tool bit is accessible for cleaning through said aperture.

23. The power drill apparatus of claim 1 wherein said power drill apparatus includes:

a motor for rotating said chuck means; and said magazine is movably supported on said motor for rotation about said axis within said housing.

24. The power drill apparatus of claim 1 wherein said means for selectively expelling the selected tool bit includes:

a cable within said housing and movable between a forward position extending at least partially into said one of said grooves and a stored position retracted from said groove; and means for moving said cable between said forward position and said stored position;

wherein said cable is moved from said stored position to said forward position to move one of said multiple tool bits into and out of said axial bore of said chuck means.

25. The power drill apparatus of claim 24 wherein said means for moving said cable between said forward position and said stored position includes:

a button located external of said housing and connected to said cable.

26. The power drill apparatus of claim 24 wherein said selected tool bit is moved back into said groove when said cable is moved to said stored position.

27. The power drill apparatus of claim 24 wherein said cable includes:

magnetic coupling means to form a flexible connection with said selected tool bit.

28. The power drill apparatus of claim 18 wherein said means for moving said cable between said stored position and said forward position includes:

a button located external of said housing and connected to said cable.

29. The power drill apparatus of claim 18 wherein said selected tool bit is moved back into said groove when said cable is moved to said stored position.

30. The power drill apparatus of claim 18 wherein said cable includes:

magnetic coupling means to form a flexible connections with said selected tool bit.

* * * * *